(12) United States Patent
Huang et al.

(10) Patent No.: US 8,931,073 B2
(45) Date of Patent: Jan. 6, 2015

(54) FIREWALL ACCESS CONTROL WITH BORDER GATEWAY PROTOCOL ATTRIBUTES

(75) Inventors: Shan Huang, Ashburn, VA (US); Michael S. Kelsen, Centreville, VA (US); Ron da Silva, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/237,678

(22) Filed: Sep. 20, 2011

(65) Prior Publication Data

US 2013/0074174 A1    Mar. 21, 2013

(51) Int. Cl.
*H04L 29/06* (2006.01)
*H04L 12/56* (2006.01)
*H04L 12/715* (2013.01)

(52) U.S. Cl.
CPC ............ *H04L 45/04* (2013.01); *H04L 63/0227* (2013.01); *H04L 63/0236* (2013.01)
USPC .......................................................... 726/11

(58) Field of Classification Search
None
See application file for complete search history.

(56) References Cited

U.S. PATENT DOCUMENTS

| 7,796,593 | B1 * | 9/2010 | Ghosh et al. | 370/389 |
| 2002/0078370 | A1 * | 6/2002 | Tahan | 713/200 |
| 2003/0056217 | A1 | 3/2003 | Brooks | |
| 2004/0249911 | A1 * | 12/2004 | Alkhatib et al. | 709/223 |
| 2006/0174035 | A1 * | 8/2006 | Tufail | 709/239 |
| 2010/0058433 | A1 * | 3/2010 | Szabo | 726/1 |
| 2010/0162378 | A1 * | 6/2010 | Jayawardena et al. | 726/12 |
| 2010/0313236 | A1 | 12/2010 | Straub | |
| 2011/0007752 | A1 | 1/2011 | da Silva et al. | |

OTHER PUBLICATIONS

Anonymous, "Border Gateway Protocol" in Wikipedia, the free encyclopedia, downloaded from http://en.wikipedia.org/wiki/Border_Gateway_Protocol on Apr. 20, 2011.
Anonymous, "Firewall (computing)" in Wikipedia, the free encyclopedia, downloaded from http://en.wikipedia.org/wiki/Firewall_(computing)on Jun. 20, 2011.
Cable Television Laboratories, Inc., DOCSIS Set-top Gateway (DSG) Interface Specification, CM-SP-DSG-I17-110210, Feb. 10, 2011.
Cable Television Laboratories, Inc., IPv4 and IPv6 eRouter Specification, CM-SP-eRouter-I05-110210, Feb. 10, 2011.
Rekhter, et al., The Internet Society, RFC 4271—A Border Gateway Protocol 4 (BGP-4), Jan. 2006.

* cited by examiner

*Primary Examiner* — Gilberto Barron, Jr.
*Assistant Examiner* — Malcolm Cribbs
(74) *Attorney, Agent, or Firm* — Otterstedt, Ellenbogen & Kammer, LLP

(57) ABSTRACT

Packets are routed from at least one internet protocol (IP) address in accordance with border gateway protocol (BGP); while carrying out the routing in accordance with the border gateway protocol (BGP), at least one border gateway protocol (BGP) attribute associated with the at least one internet protocol (IP) address is noted. A firewall policy is applied to the packets from the at least one internet protocol (IP) address based on the at least one border gateway protocol (BGP) attribute associated with the at least one internet protocol (IP) address. Techniques may be implemented, for example, on a router or on a separate firewall device coupled to a router.

24 Claims, 7 Drawing Sheets

US 8,931,073 B2

FIREWALL ACCESS CONTROL WITH BORDER GATEWAY PROTOCOL ATTRIBUTES

FIELD OF THE INVENTION

The present invention relates generally to the electrical, electronic, and computer arts, and more particularly relates to firewalls and the like.

BACKGROUND OF THE INVENTION

A firewall permits or denies network transmissions based upon a set of rules, and can be employed to protect against unauthorized access while permitting legitimate communications to pass. Firewall policy is normally carried out in a way such that the source Internet Protocol (IP) address in client-server mode is specified. The firewall policy is normally implemented by manually specifying the external IP address block that can be allowed access. In some instances, access may be further limited by allowable protocol.

SUMMARY OF THE INVENTION

Techniques are provided for firewall access control with border gateway protocol attributes.

In one aspect, an exemplary method includes the steps of routing packets from at least one internet protocol (IP) address in accordance with border gateway protocol (BGP); while carrying out the routing in accordance with the border gateway protocol (BGP), noting at least one border gateway protocol (BGP) attribute associated with the at least one internet protocol (IP) address: and applying a firewall policy to the packets from the at least one internet protocol (IP) address based on the at least one border gateway protocol (BGP) attribute associated with the at least one internet protocol (IP) address.

In another aspect, a combined firewall-router device for interposition between a network and at least one computing device to be protected, at a location in the network wherein border gateway protocol (BGP) routing is taking place, includes a persistent storage device storing a policy file in a non-transitory manner; a memory; and at least one processor, coupled to the memory. The at least one processor is operative, when the policy file is loaded into the memory, to: route packets from at least one internet protocol (IP) address in accordance with the border gateway protocol (BGP); while carrying out the routing in accordance with the border gateway protocol (BGP), note at least one border gateway protocol (BGP) attribute associated with the at least one internet protocol (IP) address; and apply a firewall policy to the packets from the at least one internet protocol (IP) address based on the at least one border gateway protocol (BGP) attribute associated with the at least one internet protocol (IP) address.

In a further aspect, a firewall device for interposition between a network and at least one computing device to be protected, at a location in the network proximate to a router wherein border gateway protocol (BGP) routing is taking place to route packets from at least one internet protocol (IP) address in accordance with the border gateway protocol (BGP), includes a persistent storage device storing a policy file in a non-transitory manner; a memory; and at least one processor, coupled to the memory. The at least one processor is operative, when the policy file is loaded into the memory, to: obtain, from the router, at least one border gateway protocol (BGP) attribute associated with the at least one internet protocol (IP) address; and apply a firewall policy to the packets from the at least one internet protocol (IP) address based on the at least one border gateway protocol (BGP) attribute associated with the at least one internet protocol (IP) address.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs and/or policies which when executed (e.g., on a router/firewall) implement such step(s); that is to say, a computer program product including a tangible computer readable recordable storage medium (or multiple such media) with computer usable program code for performing the method steps indicated stored therein in a non-transitory manner. Furthermore, one or more embodiments of the invention or elements thereof can be implemented in the form of an apparatus (e.g., a router/firewall) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects, including, for example:

greater effectiveness than current technique of defining security rules or policies at the IP protocol level, especially for larger scale security policies targeted at autonomous system boundaries; and since, in current techniques, IP protocol (for example, source IP ranges) associated with a security policy can be dynamic (in general, requiring significant administrative overheads to maintain), and since border gateway protocol (BGP) associates many attributes to a group of IP addresses (e.g., autonomous system (AS) number or community and the like), defining firewall policies through use of these attributes provides better results with less administrative overhead.

These and other features and advantages of the invention will become apparent from the following detailed description of illustrative embodiments thereof, which is to be read in connection with the accompanying drawings.

DETAILED DESCRIPTION OF PREFERRED EMBODIMENTS

Embodiments of the invention may be employed in a variety of settings. A non-limiting exemplary embodiment will be described within the context of a cable multiple system operator (MSO) providing one or more networks including one or more content-based networks. It is to be emphasized that one or more embodiments have applicability wherever a firewall is used to provide selective access between a network and one or more devices to be protected, and can be used in connection with many different kinds of networks besides content networks, such as networks carrying primarily or solely data.

Again, aspects of the invention are broadly applicable to firewalls in many different scenarios, but one or more non-limiting exemplary embodiments are provided in the context of a cable MSO or the like. Purely by way of example and not limitation, one non-limiting example in the context of an MSO includes allowing MSO video customers to access DVR service and deny other hosts for the same service. In such case, the MSO video customers can be identified via a BGP community instead of by address blocks.

Figure 1:
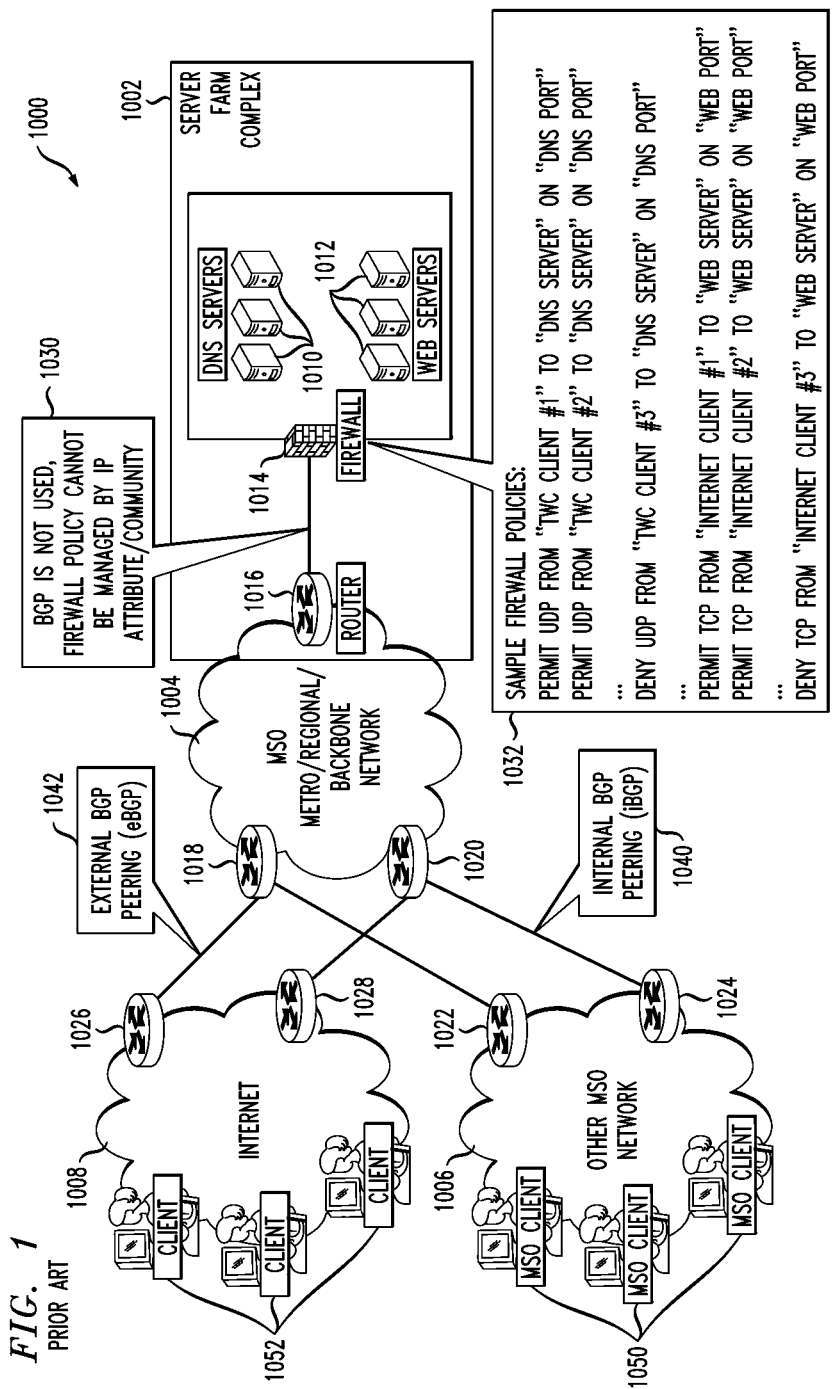
FIG. 1 is a system diagram illustrating firewall techniques in accordance with the prior art.

FIG. 1 shows an exemplary system 1000, according to the prior art. System 1000 includes a server farm complex 1002; a metropolitan, regional, or backbone network 1004 of an MSO; another network 1006 of the MSO; and a global system of interconnected computer networks that use the standardized Internet Protocol Suite (TCP/IP)(transfer control protocol/Internet protocol), commonly called the Internet 1008. As used herein, Internet with the capital "I" is the global Internet, while "internet" is a generic description of any inter-network of computer systems and routing topologies.

Network 1004 can be implemented in a variety of fashions; by way of example and not limitation, some embodiments can be implemented as a dense wavelength division multiplex (DWDM) network. Network 1004 may interconnect, for example, with one or more regional data centers of the MSO and one or more head ends of the MSO.

Server farm complex 1002 includes a plurality of servers; for example, several domain name system (DNS) servers 1010 and several web servers 1012. A firewall 1014 is interposed between router 1016 and server farm complex 1002. Router 1016 provides connectivity to metro/regional/backbone network 1004. Routers 1018, 1020 provide connectivity of metro/regional/backbone network to network 1006 and Internet 1008. Routers 1022, 1024 provide connectivity of network 1006 to metro/regional/backbone network 1004. Routers 1026, 1028 provide connectivity of Internet 1008 to metro/regional/backbone network 1004.

Network 1006 includes a number of MSO clients 1050. Internet 1008 includes a number of generic clients 1052.

Internal border gateway protocol (BGP) peering (iBGP) is made use of between networks 1004, 1006, as shown at 1040.

External BGP peering (eBGP) is made use of between network 1004 and Internet 1008, as shown at 1042. However, BGP is not used between router 1016 and firewall 1014. Thus, the firewall policy of firewall 1014 cannot be managed by IP attribute and/or community, as indicated at 1030. Sample firewall policies are depicted at 1032.

Firewall appliance 1014 is provided for security purposes and is located at the end of network 1004 in front of server farm 1002. Indeed, firewall devices (purpose built security appliances) are normally deployed in front of server farms to provide security for mission critical applications. In at least some instances, server farm 1002 may be part of one of the aforementioned regional data centers. As noted, a variety of servers may be located therein, such as DNS servers, e-mail servers, and various other servers. One or more firewalls 1014 are provided in front of the servers for protection.

Firewall policy 1032 is normally carried out in a way such that the source IP address in client-server mode is specified. In this case, the servers 1010, 1012 are located in the data center (e.g., server farm 1002) and the clients 1050, 1052 are the external devices that seek to access those servers. The firewall policy 1032 is normally implemented by manually specifying the external IP address block that can be allowed to access the servers 1010, 1012. This is the traditional way to implement a firewall. In some instances, access may be further limited by allowable protocol, such that access is limited based on a combination of source IP and protocol (e.g., limit access to a certain range of IP addresses and then to access DNS, web, hypertext transfer protocol (HTTP), further restrictions can be used based on the port).

In this regard, presently, security rules or policies are generally defined at IP protocol level based on five tuples (the skilled artisan will of course appreciate that a tuple is an ordered list of elements.):

Transmission Control Protocol (TCP)/User Datagram Protocol (UDP),
source IP (or range of source IPs),
destination IP (or range of destination IPs),
source port (or range of source ports), and
destination port (or range of destination ports)).

This approach is not very effective with respect to larger scale security policies targeted at autonomous system boundaries. Five-tuples associated with a security policy can be dynamic, in general requiring administrative overheads to maintain security policies.

Figure 2:
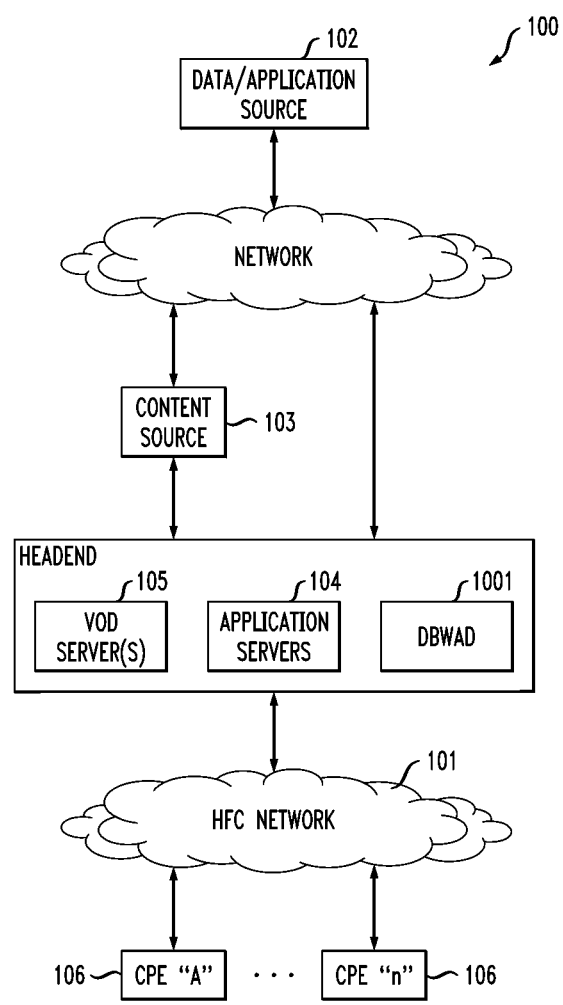
FIG. 2 is a functional block diagram illustrating an exemplary hybrid fiber-coaxial (HFC) network configuration.

As noted, embodiments of the invention may be employed in a variety of settings. In connection with the aforementioned non-limiting exemplary embodiment in the context of a cable multiple system operator (MSO) providing one or more networks including one or more content-based networks, certain non-limiting exemplary features of a content-based network, such as a video content network, will be presented in connection with FIGS. 2-4. FIG. 2 illustrates a typical content-based network configuration 100. In some instances, the head end, discussed further below, is located on network 1004. It is to be emphasized that embodiments of the invention can be employed in many different contexts and the content-based network is depicted purely as a non-limiting example. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. Also included is a dynamic bandwidth allocation device (DBWAD) 1001 such as a global session resource manager, which is itself a non-limiting example of a session resource manager. The distribution server(s) 104, VOD servers 105, DBWAD 1001, and CPE(s) 106 are connected via a bearer (e.g., hybrid fiber cable (HFC)) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 3 (described in greater detail below) may be used.

It should be noted at this point that in addition to a conventional HFC network or a switched digital network, other kinds of video content networks can be employed for network 101 (e.g., fiber-to-the-home (FTTH) or fiber-to-the-curb (FTTC); digital subscriber line (DSL); wireless networks such as Wi-Fi, WiMAX (Worldwide Interoperability for Microwave Access), 3GPP Long Term Evolution (LTE), various 4G standards; and the like). Again, for the avoidance of doubt, the HFC network details set forth herein are merely provided to show one non-limiting exemplary environment and it is to be emphasized that embodiments of the invention can be employed in many different situations where a firewall device or the like is interposed between: (i) a network; and (ii) one or more devices to be protected such as, for example, one or more servers or the like.

The data/application origination point 102 comprises any medium that allows data and/or applications (such as a VOD-based (VOD=video on demand) or "Watch TV" application) to be transferred to a distribution server 104 (for example, over a suitable network, not separately numbered). This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box," and the like.

Figure 3:
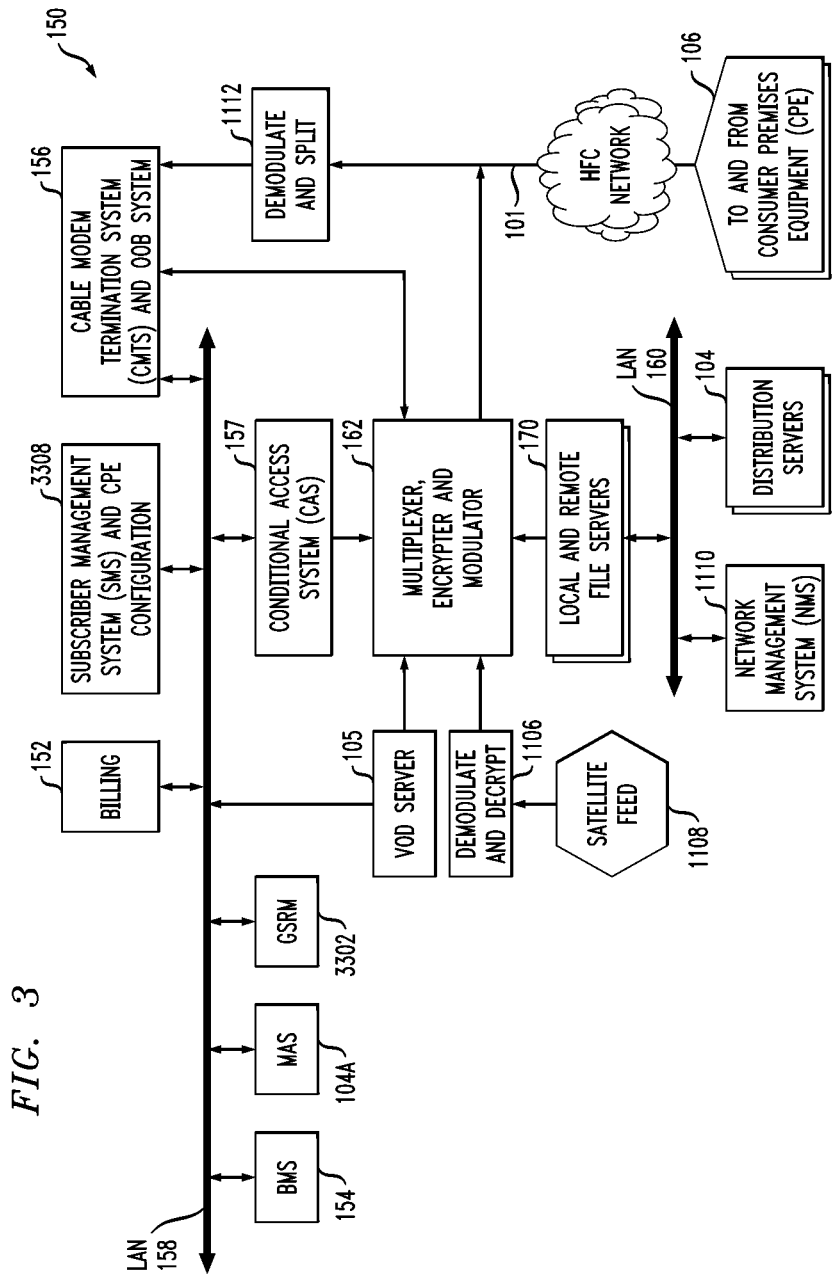
FIG. 3 is a functional block diagram illustrating one exemplary HFC cable network head-end configuration.

Referring now to FIG. 3, one exemplary embodiment of a head-end architecture is described. As shown in FIG. 3, the head-end architecture 150 comprises typical head-end components and services including billing module 152, subscriber management system (SMS) and CPE configuration management module 308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator or multiple system operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 4) via a variety of interposed network components.

It should be noted at this point that with the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well-known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs. but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes. Other pertinent materials include the Data-Over-Cable Service Interface Specifications, IPv4 and IPv6 eRouter Specification (version 1.0 and any other versions), CM-SP-eRouter-I05-110210, and the Data-Over-Cable Service Interface Specifications, DOCSIS Set-top Gateway (DSG) Interface Specification, CM-SP-DSG-I17-110210, both available from Cable Television Laboratories, Inc., and both expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. Server farm 1002 may in general include many different types of servers and may or may not include broadcast servers, VOD servers, or servers related to video or other content.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 302, a Mystro Application Server 104A, and a business management system 154, all of which are coupled to LAN 158. GSRM 302 is one specific form of a DBWAD 1001 and is a non-limiting example of a session resource manager.

Figure 4:
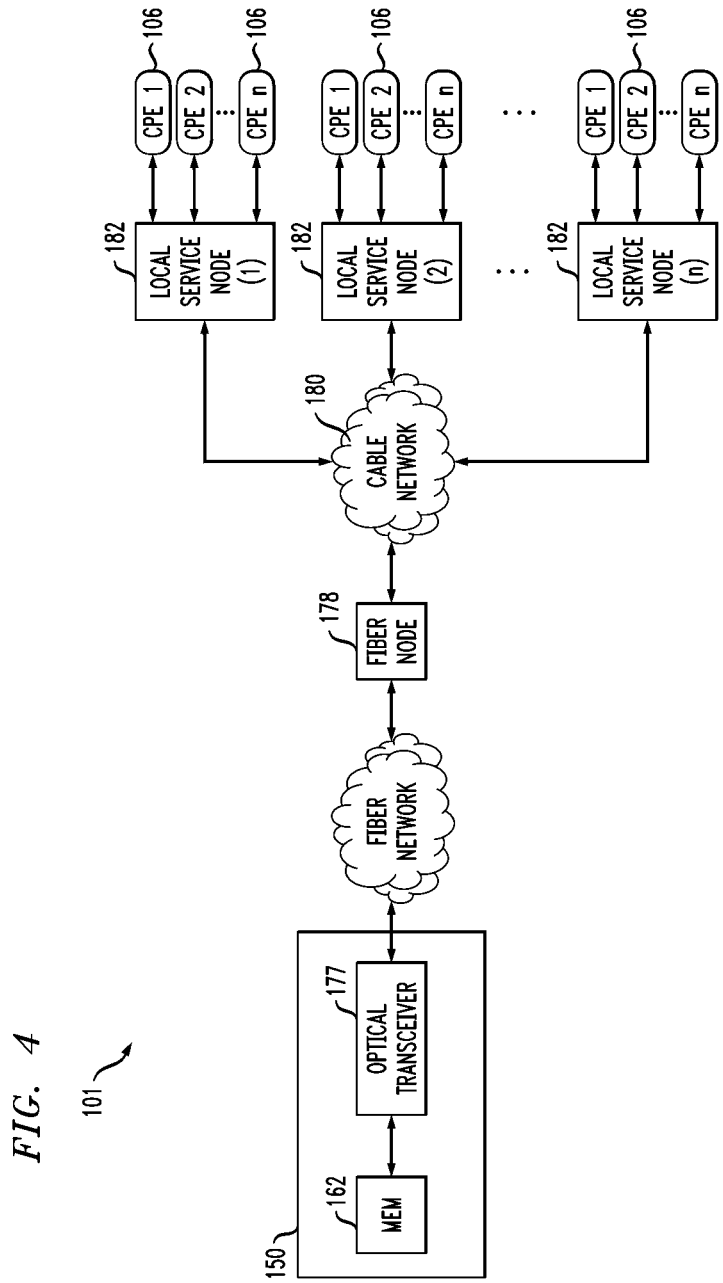
FIG. 4 is a functional block diagram illustrating one exemplary local service node configuration.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed to a fiber node 178, which further distributes the signals over a distribution network 180 to a plurality of local servicing nodes 182. This provides an effective 1:N expansion of the network at the local service end.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise. the controller assigns an unused carrier to carry the requested program material, and informs the set-top terminal of the identity of the newly assigned carrier. The controller also retires those carriers assigned for the program channels which are no longer watched by the subscribers in the neighborhood.

Note that reference is made herein, for brevity, to features of the "Brooks invention"—it should be understood that no inference should be drawn that such features are necessarily present in all claimed embodiments of Brooks.

The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system. the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device.

Figure 5:
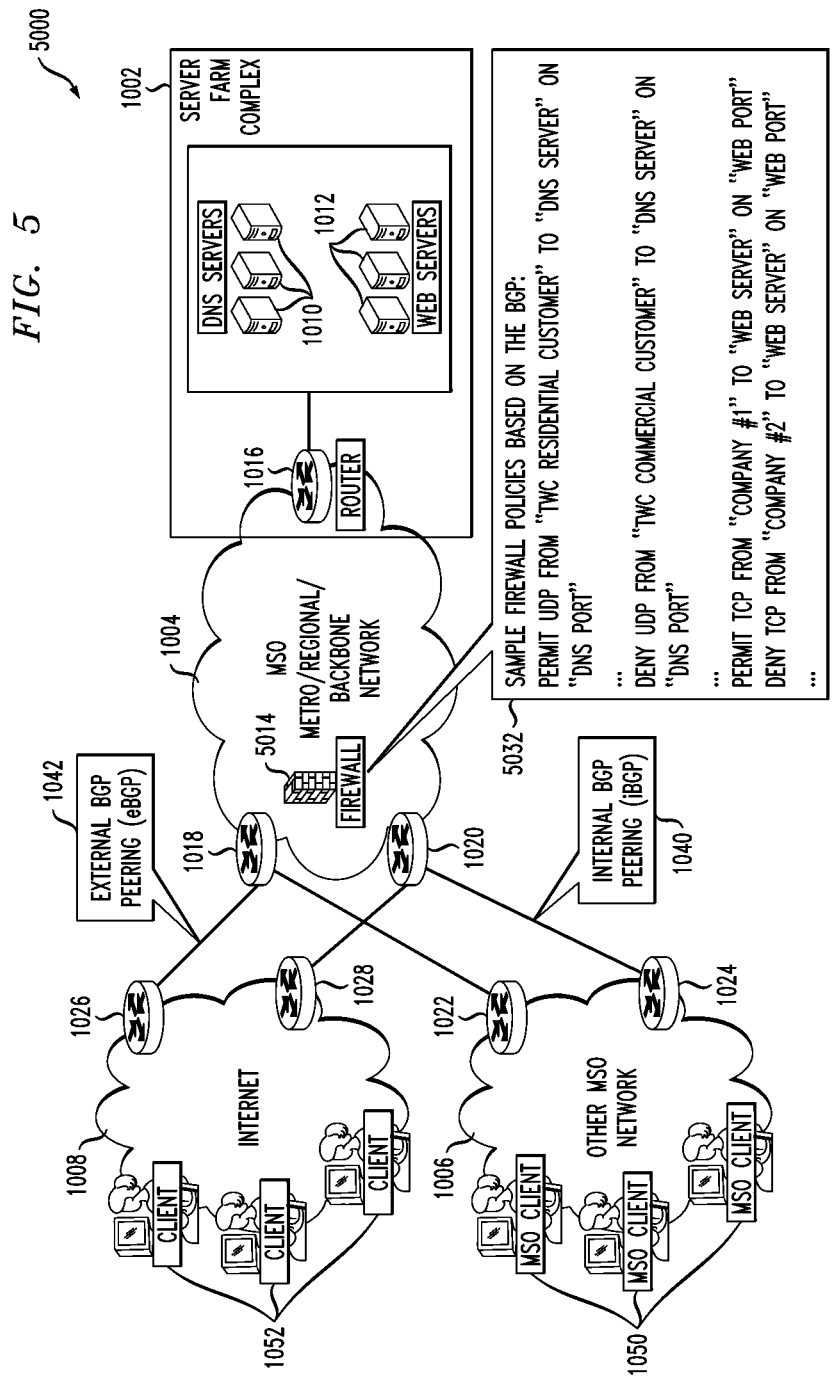
FIG. 5 is a system diagram illustrating firewall techniques in accordance with an aspect of the invention.

Reference should now be had to FIG. 5, which is a system diagram 5000 illustrating firewall techniques in accordance with an aspect of the invention, wherein elements similar to those in FIG. 1 have the same reference character. Recall that, as noted above, in current techniques, five-tuples associated with a security policy can be dynamic, in general requiring administrative overheads to maintain security policies. One or more embodiments advantageously employ Border Gateway Protocol (BGP) to define security policy by using these attributes instead of the five-tuple approach. BGP associates many attributes to a group of IP addresses (e.g. autonomous system (AS) number or community, and so on). For example, all subscribers of a given MSO in a given city may belong to BGP AS 20001; hence a common firewall policy can be defined based on this attribute for all customers in that city. Additionally, subscribers in that city can be further tagged as residential, commercial, or VoIP using a community attribute; hence, more granular policies can also be defined based on the community attribute.

When BGP runs inside an autonomous system (AS), it is referred to as Internal BGP; conversely, when it runs between autonomous systems, it is called External BGP. Routers on the boundary of one autonomous system exchanging information with another autonomous system are known as border or edge routers. Within the Internet, an autonomous system is a collection of connected Internet Protocol (IP) routing prefixes under the control of one or more network operators that presents a common, clearly defined routing policy to the Internet.

As the Internet 1008 gets larger and larger, the firewalls become more and more powerful. In general, BGP is a more prominent protocol at the core than at the edge. Thus, in the exemplary embodiment of FIG. 5, the firewall 5014 is located more towards the core rather than towards the edge; firewall 5014 thus approaches the core of network 1004 instead of being interposed between router 1016 and server farm 1002 as in FIG. 1. The previous methodology described above with respect to FIG. 1 has a significant limitation—it is more of an ad hoc policy, wherein each new client request requires identifying such client and then adding the client into the firewall policy 1032. Over time, this can become quite cumbersome, inasmuch as there is no common attribute or community to identify a range of IP addresses.

As noted, one or more embodiments advantageously employ border gateway protocol (BGP). At the core of the network, BGP is essentially a demarcation point for different autonomous systems or different Internet service providers (ISPs). An MSO may, for example, have a BGP arrangement with certain entities (e.g., service or content providers, non-limiting examples of which are Google Inc. of Mountain View, Calif., USA and/or Yahoo! Inc. of Sunnyvale, Calif., USA), and many other companies, at the MSO's parent location. An attractive feature of BGP is that it comes with a whole range of communities that can be used. A community is essentially an attribute that can be used to identify a group of IP addresses. Instead of identifying a client by an ad hoc, random IP address, it may be possible, based on a certain community, to allow all traffic from a given community (e.g., the "ACME" community), for example—as long as the "community" matches "ACME" the traffic will be permitted in the firewall. BGP includes many attributes, allowing an entity such as an MSO to define its own attributes or tag a range of clients 1050, 1052 that are allowed inside to a server in farm 1002. One or more embodiments provide improved organization and replace the ad hoc management task required in current firewall management.

It should be noted that one or more embodiments are equally applicable to Internet Protocol version 4 (IPv4) and Internet Protocol version 6 (IPv6), and will work in a similar manner for both IPv4 and IPv6. One or more embodiments identify a range of similar clients to allow or disallow access to infrastructure of an MSO or the like.

In one or more embodiments, the hardware of firewalls 1014, 5014 can be identical, with the changes being specified in the policies 1032, 5032; any suitable commercial firewall device can be used. In one or more embodiments, both firewall 1014 and firewall 5014 are security devices but also are routing devices (meaning they need to make routing decisions by IP addresses). One or more embodiments of the invention, such as firewall 5014, take advantage of both the security and routing features. In this case, by using BGP as the routing protocol, firewall 5014 already knows the BGP attribute associated with an IP address via the routing decision process prior to the firewall decision process.

Given the teachings herein, including the examples in 5032, the skilled artisan will be able to write a policy file for a firewall to implement one or more embodiments.

Figure 9:
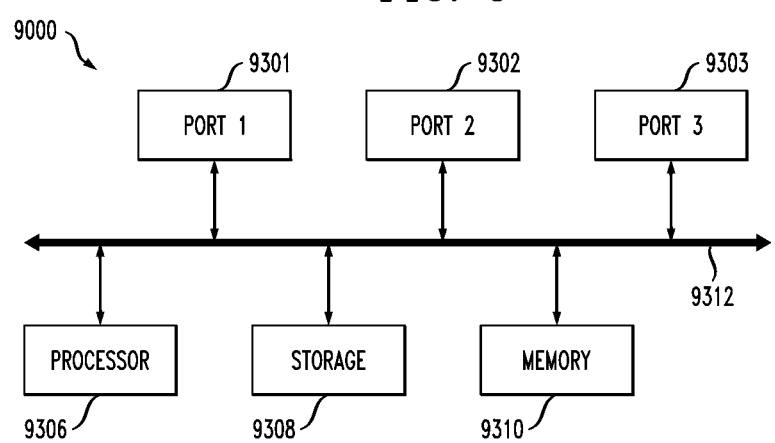
FIG. 9 is a block diagram of a firewall device, according to an aspect of the invention.

As seen in FIG. 9, a non-limiting exemplary firewall/router device 9000 includes a plurality of ports, e.g., three ports 9301, 9302, and 9303, each directly or indirectly coupled to a bus 9312. Traffic entering on one port is analyzed as described herein and either dropped or routed to one or more other ports. A microprocessor 9306, persistent storage unit 9308, and memory unit 9310 are also coupled to the exemplary bus 9312. The memory unit 9310 typically includes a random access memory (RAM) and storage unit 9308 typically includes a hard disk drive, an optical drive (e.g., CD-ROM or DVD), NAND flash memory, RAID (redundant array of inexpensive disks) configuration, or some combination thereof.

During operation of the device 9000, software located in the storage unit 9308 is run on the microprocessor 9306 using the memory unit 9310 (e.g., a program memory within or external to the microprocessor). The software controls the operation of the other components of the system, and provides various other functions within the device. Other system software/firmware may also be externally reprogrammed, such as using a download and reprogramming of the contents of the flash memory, replacement of files on the storage device or within other non-volatile storage, etc. This allows for remote reprogramming or reconfiguration of the device 9000 by the MSO or other network agent. Storage 9308 may also include a policy file which is loaded into memory 9310 and causes processor 9306 to implement the policies described herein.

FIG. 9 represents, at a high level, both a router implementing a firewall policy and a separate firewall device coupled to one or more routers as described elsewhere herein.

Figure 6:
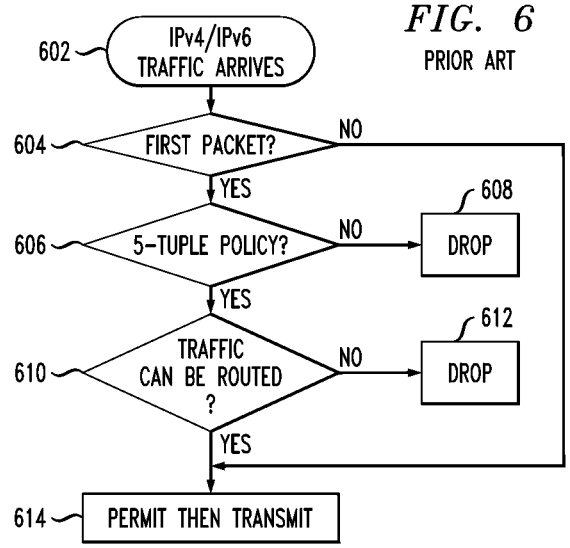
FIG. 6 is a flow chart of exemplary method steps in accordance with the prior art.

Reference should now be had to FIG. 6, which shows a typical firewall flow chart without the BGP decision included, as known from the prior art. FIG. 6 is typical of the firewall logic that would be used by firewall 1014 in FIG. 1. In step 602, internet protocol traffic (v4 and/or v6) arrives. In decision block 604, a determination is made whether a given packet is the first packet from a given IP address. If not, as per the "no" branch, proceed to step 614 where the traffic is transmitted if traffic from the given IP address was previously determined to be permitted. If the given packet is the first packet from a given IP address, as per the "yes" branch of block 604, proceed to decision block 606 and determine if there is compliance with the 5-tuple policy. If not, as per the "no" branch of block 606, drop the packet as per 608. If there is compliance, as per the "yes" branch of block 606, proceed to decision block 610. In decision block 610, determine if the packet can be routed. If not, as per the "no" branch of block 610, drop the packet as per 612. If there is compliance, as per the "yes" branch of block 610, proceed to block 614 described above.

Figure 7:
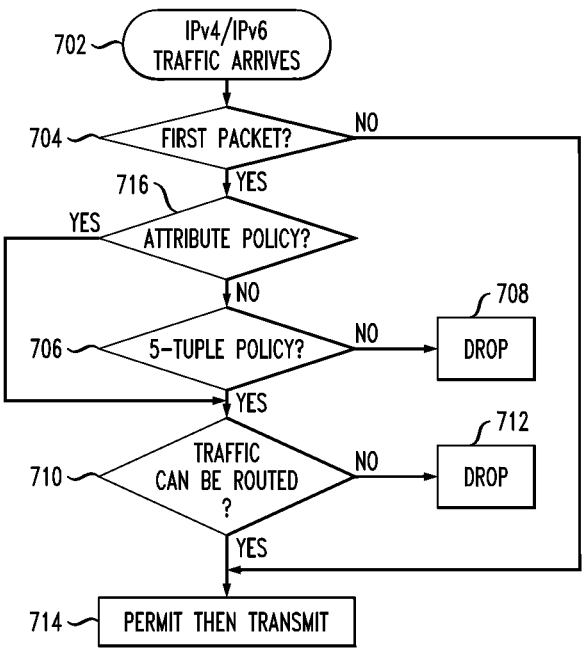
FIG. 7 is a flow chart of exemplary method steps in accordance with an aspect of the invention.

FIG. 7 shows a firewall flow chart with the BGP decision included, in accordance with an aspect of the invention. FIG. 7 shows typical logic used by the firewall 5014. Steps similar to those in FIG. 6 have received the same reference character incremented by one hundred. In step 702, internet protocol traffic (v4 and/or v6) arrives. In decision block 704, a determination is made whether a given packet is the first packet from a given IP address. If not, as per the "no" branch, proceed to step 714 where the traffic is transmitted if traffic from the given IP address was previously determined to be permitted. If the given packet is the first packet from a given IP address, as per the "yes" branch of block 704, proceed to decision block 716 and check for compliance with the BGP attribute policy in accordance with an aspect of the invention. If there is not compliance with the attribute policy, proceed to decision block 706 and determine if there is compliance with the 5-tuple policy. If not, as per the "no" branch of block 706, drop the packet as per 708. If there is compliance, as per the "yes" branch of block 706, proceed to decision block 710. In decision block 710, determine if the packet can be routed. If not, as per the "no" branch of block 710, drop the packet as per 712. If there is compliance, as per the "yes" branch of block 710, proceed to block 614 described above. On the other hand, if, in decision block 716, there is compliance with the attribute policy, proceed to decision block 710 and proceed as described above.

It should be noted that in FIG. 7, if there is compliance with the attribute policy, as per the "YES" branch of block 716, a number of prior-art steps are bypassed and processing proceeds directly to block 710. On the other hand, if the attribute policy has not been complied with, then a first option, shown in FIG. 7, is to default to the previous (prior art) logic as per the "NO" branch of block 716, and still potentially pass the traffic if the prior art 5-tuple policy is complied with. In a second option, if the attribute policy has not been complied with, processing could simply proceed to 712 and the packets could be dropped. In the first option, the 5-tuple policy should still be periodically updated; this is not required in the second option.

It should be noted that for IPv4 using the 5-tuple according to the prior art, the source and destination addresses, and type of protocol (TCP/UDP) are part of the packet header; and the source port and destination port are part of the TCP/UDP header within the data of the IP packet. Similarly, for IPv6 using the 5-tuple according to the prior art, the source and destination addresses, and next header field (TCP/UDP) are part of the packet header; and the source port and destination port are part of the TCP/UDP header within the data of the IP packet.

In one or more embodiments, the firewall already "knows" the BGP attribute associated with an IP address via the routing decision process prior to the firewall decision process. In many cases, a particular single BGP attribute may be associated with many (e.g., hundreds) of addresses for an AS. The BGP attribute could be, for example, a random number assigned by the AS. When a router of, say, an MSO "talks," for example, to a router of the AS, the router of the MSO knows that all addresses of the AS have the single, common BGP attribute. So, in one or more embodiments, instead of having hundreds of lines of policy, say, one for each of the addresses associated with the AS, only a single line of policy is needed for the single common BGP attribute.

One or more embodiments are implemented in a region of a network wherein routing is taking place on the basis of the BGP. Because routing is taking place on the basis of the BGP, policies can be defined on the basis of a BGP attribute rather than on individual IP addresses. An illustrative analogy is as follows: consider a highway toll barrier at which it is desired to allow cars from state A to pass but not cars from state B. Routing based on the prior art is somewhat akin to having to know the license plate number of all plates in states A and B and to describe the policy individually for each plate number; i.e., policy file would be "PASS ABC 123, PASS ABC 234, . . . BLOCK ABC 678, BLOCK ABC 789, . . . ," where ABC 123, ABC 234, . . . are individual plate numbers from state A and ABC 678, ABC 789, . . . are individual plate numbers from state B. Routing in accordance with one or more embodiments of the invention is somewhat akin to simply having to know what state a given plate is associated with, and the policy file would be simply "PASS STATE A, BLOCK STATE B."

In one or more embodiments, the source address may be used for return traffic and the destination address is used for the next hop. The firewall per se will not "know" how to forward traffic or send traffic back without learning the routing protocol (and destinations) from a neighboring router. Thus, one or more embodiments are implemented in a firewall which is part of a router which routes on the basis of BGP, or in a stand-alone firewall device which is coupled to, and in communication with, a router or routers which route on the basis of BGP. In either case, the router(s) which route(s) on the basis of BGP will be aware of, inter alia, the BGP attribute. The firewall will "speak" the BGP routing protocol inasmuch as the firewall is itself a network device which needs to know how to send the traffic to the next hop and where the traffic comes from (last hop).

This process can, in and of itself, be carried out via interior gateway protocol (IGP), a routing protocol that is used to exchange routing information within AS, or via BGP. In IGP, there is no insight as to BGP attributes. Router 1016 in FIG. 1 routes based on IGP. Routers 1018, 1020 in FIG. 5 route based on BGP. By moving the firewall to the edge, as in the exemplary embodiment of FIG. 5, where routing takes place based on BGP, firewall decisions can advantageously be made based on BGP attributes. When routing in accordance with the BGP, the header of the packet is examined to determine the source and destination addresses. The BGP attribute itself is not part of the packet; rather, it is part of the BGP protocol. Two routers "talking" BGP will communicate in accordance with the BGP protocol; for example, Router A will tell Router B "if you are sending traffic to a certain destination, you should come to me; here is the range of IP addresses that I can route and here is the related BGP attribute." The BGP attribute is thus not part of the packet but rather part of the controlling mechanism within BGP. A helpful analogy is to the air traffic control system. The air traffic control system is somewhat analogous to the BGP: the aircraft are somewhat analogous to the packets. In a network analogy, one side is control plane traffic and the other is data plane traffic. The latter concerns actual sending of traffic from point A to point B; the former is how to set up the path (e.g., how to set the routing protocol between the routers to carry the data traffic). The BGP attribute is thus control information exchanged between the BGP routers separate and apart from the data packets they are routing back and forth to each other. This process is known, in and of itself, from RFC 4271, which is expressly incorporated herein by reference in its entirety for all purposes. In order to route traffic, BGP routers exchange, inter alia, the attribute information.

It is worth noting that presently, security rules or policies are defined at the IP protocol level. This approach is not very effective when it comes to larger scale security policies targeted at autonomous system boundaries. IP protocol (e.g. source IP ranges) associated with a security policy can be dynamic, in general requiring administrative overheads to maintain. Advantageously, in one or more embodiments, Border Gateway Protocol (BGP) associates many attributes to a group of IP addresses (e.g. AS number or community etc), hence, a better way to define firewall policies is to use these attributes for firewall policies. As noted, in some cases, if a BGP attribute is not complied with, a default to the 5-tuple (including IP address) approach is possible.

Recapitulation

Attention should now again be given to FIGS. 5, 7, and 9. Given the discussion thus far, it will be appreciated that, in general terms, an exemplary method, according to an aspect of the invention, includes the step of routing packets from at least one internet protocol (IP) address in accordance with border gateway protocol (BGP), as would be done, for example, by routers 1018, 1020 in FIG. 5. An additional step includes, while carrying out the routing in accordance with the border gateway protocol (BGP), noting at least one border gateway protocol (BGP) attribute associated with the at least one internet protocol (IP) address (in a non-limiting example, a community attribute common to all the IP addresses of the clients 1050 of the other MSO network 1006). A further step includes applying a firewall policy to the packets from the at least one internet protocol (IP) address based on the at least one border gateway protocol (BGP) attribute associated with the at least one internet protocol (IP) address, as seen in FIG. 7; for example, steps 702, 704, 716.

With regard to the step of "while carrying out the routing in accordance with the border gateway protocol (BGP),"

"while" is intended to broadly include noting the at least one border gateway protocol (BGP) attribute at any point in the BGP process, including during actual routing of packets and/or during a prior process of establishing BGP communication between two or more routers or other network devices. See above discussion of BGP control process.

As noted, in some cases, the at least one border gateway protocol (BGP) attribute is a community attribute and the applying step includes applying the firewall policy to the packets from the at least one internet protocol (IP) address based on the community attribute.

As seen at the "YES" branch of block 716, in some cases, the applying step includes passing the packets from the at least one internet protocol (IP) address if the community attribute identifies a source of the packets, based on the community attribute, as an appropriate source (the subsequent check in step 710 is optional but preferred).

The appropriate source could be, for example, a predetermined service provider and/or a predetermined content provider.

As discussed above, in some instances (alternative where "NO" branch of 716 leads directly to 712), the applying step includes dropping the packets from the at least one internet protocol (IP) address if the community attribute identifies a source of the packets, based on the community attribute, as an inappropriate source.

On the other hand, in some cases, as shown at 706, 708, the applying step includes subjecting the packets from the at least one internet protocol (IP) address to conventional firewall logic if the community attribute identifies a source of the packets, based on the community attribute, as an inappropriate source.

As noted, the method can be implemented, for example, on a router or on a separate firewall device coupled to a router. In the latter case, an additional step includes locating a firewall device at a network location in proximity to a location where the routing in accordance with the border gateway protocol (BGP) is being carried out (e.g., firewall 5014 is separate from but adjacent to routers 1018, 1020); and providing at least one of program instructions and a policy file (see generally 5032 for a non-limiting example) to the firewall device to cause the firewall device to carry out the step of applying the firewall policy. In the former case, additional steps include providing firewall functionality on a router where the routing in accordance with the border gateway protocol (BGP) is being carried out (e.g., firewall 5014 is on router 1018 and/or 1020); and providing at least one of program instructions and a policy file (see generally 5032 for a non-limiting example) to cause the firewall functionality on the router to carry out the step of applying the firewall policy.

A device that might be used in the former case includes a combined firewall-router device for interposition between a network 1006, 1008 and at least one computing device 1010, 1012 to be protected, at a location in the network (location of firewall 5014 and routers 1018, 1020) wherein border gateway protocol (BGP) routing is taking place. As seen in FIG. 9, the firewall device includes a persistent storage device 9308 storing a policy file in a non-transitory manner; a memory 9310; and at least one processor 9306, coupled to the memory (e.g., through bus 9312), and operative, when the policy file is loaded into the memory, to carry out any one or more of the method steps described herein.

A device that might be used in the latter case includes a firewall device for interposition between a network 1006, 1008 and at least one computing device 1010, 1012 to be protected, at a location in the network (location of firewall 5014) proximate to a router (routers 1018, 1020) wherein border gateway protocol (BGP) routing is taking place to route packets from at least one internet protocol (IP) address in accordance with the border gateway protocol (BGP). The firewall device includes a persistent storage device 9308 storing a policy file in a non-transitory manner; a memory 9310; and at least one processor 9306, coupled to the memory, and operative, when the policy file is loaded into the memory, to carry out one or more method steps; for example, to: obtain, from the router, at least one border gateway protocol (BGP) attribute associated with the at least one internet protocol (IP) address; and apply a firewall policy to the packets from the at least one internet protocol (IP) address based on the at least one border gateway protocol (BGP) attribute associated with the at least one internet protocol (IP) address. The communication with the separate router could be, for example, over one of the ports 9301, 9302, 9303.

In any case, the statement that the at least one processor is operative to carry out one or more method steps when the policy file is loaded into memory should be broadly construed; it may be that only the step of applying the firewall policy is directly influenced by the policy file; steps such as routing and noting the BGP attribute may be carried out by the processor using hardware or a combination of hardware and software other than the policy file.

As noted elsewhere herein, aspects of the invention also contemplate an apparatus including means for carrying out any one, some, or all of the method steps. The means broadly include a combined router and firewall device, or a separate firewall device coupled to one or more routers. Thus, means for routing packets from at least one internet protocol (IP) address in accordance with border gateway protocol (BGP) could include a stand-alone BGP router or a combined BGP router and firewall. Means for, while carrying out the routing in accordance with the border gateway protocol (BGP), noting at least one border gateway protocol (BGP) attribute associated with the at least one internet protocol (IP) address, could include a stand-alone BGP router or a combined BGP router and firewall carrying out BGP control as described above. The means for applying a firewall policy to the packets from the at least one internet protocol (IP) address based on the at least one border gateway protocol (BGP) attribute associated with the at least one internet protocol (IP) address could include a device as shown in FIG. 9.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code that is stored thereon in a non-transitory manner and which is configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a non-transitory manner on a tangible computer-readable recordable storage medium (or multiple such media). Appropriate interconnections via bus, network, and the like can also be included.

Many aspects of the invention can be implemented, or at least facilitated, for example, by a firewall, as shown in FIG. 9, with suitable hardware and/or software layers and/or policies to implement logic as described herein.

Figure 8:
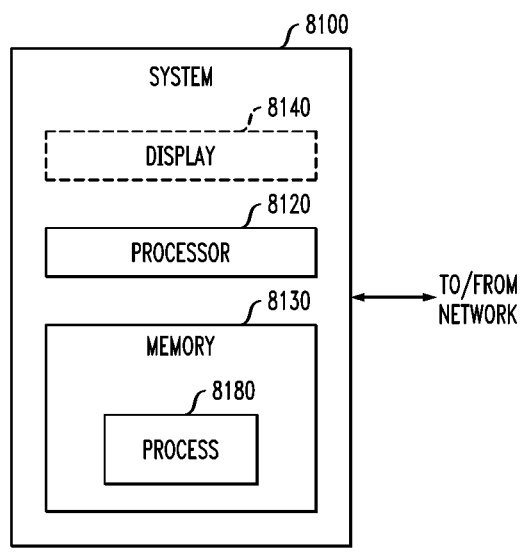
FIG. 8 is a block diagram of an exemplary computer system useful in implementing at least a portion of one or more embodiments of the invention.

FIG. 8 is a block diagram of a data processing system 8100, processor 8120 of which is representative of processors associated with servers, clients, set top terminals 106, DBWAD, SRM, GSRM, MAS 104A, and various elements with processing capability depicted in the figures, such as servers 1010, 1012.

As shown in FIG. 8, memory 8130 configures the processor 8120 to implement one or more methods, steps, and functions (collectively, shown as process 8180 in FIG. 8). The memory 8130 could be distributed or local and the processor 8120 could be distributed or singular. The memory 8130 could be implemented as an electrical, magnetic or optical memory, or any combination of these or other types of storage devices. It should be noted that if distributed processors are employed, each distributed processor that makes up processor 8120 generally contains its own addressable memory space. It should also be noted that some or all of computer system 8100 can be incorporated into an application-specific or general-use integrated circuit. For example, one or more processes could be implemented in hardware in an ASIC rather than using firmware. Display 8140 is representative of a variety of possible input/output devices (e.g., mice, keyboards, printers, etc.).

As is known in the art, part or all of one or more aspects of the methods and apparatus discussed herein may be distributed as an article of manufacture that itself includes a computer readable medium having computer readable code means embodied thereon (e.g., with instructions and/or policies to be stored in storage 9308 and loaded into memory 9310 to cause processor 9306 to implement the routing and/or firewall aspects with respect to traffic on ports 9301-9303. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a processor to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers, and/or router/firewall 9000, described herein each contain a memory that can configure associated processors to implement certain methods, steps, and functions disclosed herein. The memories could be distributed or local and the processors could be distributed or singular. The memories could be implemented as an electrical, magnetic or optical memory, or any combination of these or other types of storage devices. Moreover, in at least some instances, the term "memory" encompasses any information able to be read from or written to an address in the addressable space accessed by an associated processor. With this definition, information on a network is still within a memory because the associated processor can retrieve the information from the network.

Thus, elements of one or more embodiments of the present invention can make use of computer and/or microprocessor technology with appropriate instructions to implement method steps described herein.

As used herein, including the claims, a "server" includes a physical data processing system (for example, system 8100 as shown in FIG. 8) running a server program. It will be understood that such a physical server may or may not include a display, keyboard, or other input/output components.

Furthermore, it should be noted that any of the methods described herein can include an additional step of providing a system comprising one or more distinct software modules embodied on one or more tangible computer readable storage media (e.g., in storage 9308 or on another tangible medium for ultimate loading into storage 9308). All the modules (or any subset thereof) can be on the same medium, or each can be on a different medium, for example. The modules can include, for example, a firewall policy module; any or all of the software components shown in the figures can be implemented with suitable modules. The method steps can then be carried out using the distinct software module(s) of the system, as described above, executing on the one or more hardware processors. The same then form a particular machine, for example:

a router configured in accordance with BGP;

a firewall device which is implemented on, or coupled to, the router and which carries out firewall logic under the influence of the firewall policy module (e.g., a policy file on a storage medium); the firewall logic may itself be implemented in hardware or a combination of hardware and software; and the aforementioned firewall policy module.

Further, a computer program product can include a tangible computer-readable recordable storage medium with code adapted to be executed to carry out one or more method steps described herein, including the provision of the system with the distinct software module(s). In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, UNIX shell scripts (for example, to generate information to supply to the GSRM), and the like. Note that EBIF would typically only be employed in connection with a set-top box. RTSP and/or RPC can be employed for interface protocols, for example. Furthermore, non-limiting examples of useful database software include Access® software (registered mark of Microsoft Corporation, Redmond, Wash., USA); Oracle® software (registered mark of Oracle International Corporation, 500 Oracle Parkway, Redwood City, Calif. 94065, USA); Informix® software (registered mark of International Business Machines Corporation, Armonk, N.Y., USA); and structured query language (SQL) software available from many sources, including Microsoft Corporation, Redmond, Wash., USA).

Accordingly, it will be appreciated that one or more embodiments of the invention can include a computer program product including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein; e.g., in connection with FIGS. 5, 7, and 9.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, any blocks, components, sub-blocks, sub-components, modules and/or sub-modules may be realized by one or more DSPs. A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   determining whether packets can be routed from at least one internet protocol (IP) address in accordance with border gateway protocol (BGP) or a tuple policy;
   routing said packets from said at least one internet protocol (IP) address in accordance with said border gateway protocol (BGP) upon determining that said packets can be routed from said at least one internet protocol (IP) address in accordance with said border gateway protocol (BGP), bypassing determining compliance of said packets with said tuple policy;
   while carrying out said routing in accordance with said border gateway protocol (BGP), noting at least one border gateway protocol (BGP) attribute associated with said at least one internet protocol (IP) address; and
   applying a firewall policy to said packets from said at least one internet protocol (IP) address based on said at least one border gateway protocol (BGP) attribute associated with said at least one internet protocol (IP) address.

2. The method of claim 1, wherein said at least one border gateway protocol (BGP) attribute comprises a community attribute and wherein said applying step comprises applying said firewall policy to said packets from said at least one internet protocol (IP) address based on said community attribute, and wherein said community attribute corresponds to a characteristic of at least one subscriber and is distinct from an IP address of the subscriber.

3. The method of claim 2, wherein said applying step comprises passing said packets from said at least one internet protocol (IP) address if said community attribute identifies a source of said packets, based on said community attribute, as an appropriate source.

4. The method of claim 3, wherein said appropriate source comprises at least one of a predetermined service provider and a predetermined content provider.

5. The method of claim 2, wherein said applying step comprises dropping said packets from said at least one internet protocol (IP) address if said community attribute identifies a source of said packets, based on said community attribute, as an inappropriate source.

6. The method of claim 2, wherein said applying step comprises subjecting said packets from said at least one internet protocol (IP) address to conventional firewall logic if said community attribute identifies a source of said packets, based on said community attribute, as an inappropriate source.

7. The method of claim 1, further comprising;
   locating a firewall device at a network location in proximity to a location where said routing in accordance with said border gateway protocol (BGP) is being carried out; and
   providing at least one of program instructions and a policy file to said firewall device to cause said firewall device to carry out said step of applying said firewall policy.

8. The method of claim 1, further comprising;
   providing firewall functionality on a router where said routing in accordance with said border gateway protocol (BGP) is being carried out; and
   providing at least one of program instructions and a policy file to cause said firewall functionality on said router to carry out said step of applying said firewall policy.

9. A combined firewall-router device for interposition between a network and at least one computing device to be protected, at a location in said network wherein border gateway protocol (BGP) routing is taking place, said firewall device comprising:
   a persistent storage device storing a policy file in a non-transitory manner;
   a memory; and
   at least one processor, coupled to said memory, and operative, when said policy file is loaded into said memory, to:
      determine whether packets can be routed from at least one internet protocol (IP) address in accordance with said border gateway protocol (BGP) or a tuple policy;
      route said packets from said at least one internet protocol (IP) address in accordance with said border gateway protocol (BGP) upon determining that said packets can be routed from said at least one internet protocol (IP) address in accordance with said border gateway protocol (BGP), bypassing determining compliance of said packets with said tuple policy;
      while carrying out said routing in accordance with said border gateway protocol (BGP), note at least one border gateway protocol (BGP) attribute associated with said at least one internet protocol (IP) address; and
      apply a firewall policy to said packets from said at least one internet protocol (IP) address based on said at least one border gateway protocol (BGP) attribute associated with said at least one internet protocol (IP) address.

10. The combined firewall-router device of claim 9, wherein said at least one border gateway protocol (BGP) attribute comprises a community attribute and wherein said at least one processor is operative to apply said firewall policy by applying said firewall policy to said packets from said at least one internet protocol (IP) address based on said community attribute, and wherein said community attribute corresponds to a characteristic of at least one subscriber and is distinct from an IP address of the subscriber.

11. The combined firewall-router device of claim 10, wherein said at least one processor is operative to apply said firewall policy by passing said packets from said at least one internet protocol (IP) address if said community attribute identifies a source of said packets, based on said community attribute, as an appropriate source.

12. The combined firewall-router device of claim 11, wherein said appropriate source comprises at least one of a predetermined service provider and a predetermined content provider.

13. The combined firewall-router device of claim 10, wherein said at least one processor is operative to apply said firewall policy by dropping said packets from said at least one internet protocol (IP) address if said community attribute identifies a source of said packets, based on said community attribute, as an inappropriate source.

14. The combined firewall-router device of claim 10, wherein said at least one processor is operative to apply said firewall policy by subjecting said packets from said at least one internet protocol (IP) address to conventional firewall logic if said community attribute identifies a source of said packets, based on said community attribute, as an inappropriate source.

15. A firewall device for interposition between a network and at least one computing device to be protected, at a location in said network proximate to a router wherein border gateway protocol (BGP) routing is taking place to route packets from at least one internet protocol (IP) address in accordance with the border gateway protocol (BGP), said firewall device comprising:
- a persistent storage device storing a policy file in a non-transitory manner;
- a memory; and
- at least one processor, coupled to said memory, and operative, when said policy file is loaded into said memory, to:
  - obtain, from the router, at least one border gateway protocol (BGP) attribute associated with the at least one internet protocol (IP) address; and
  - apply a firewall policy to said packets from said at least one internet protocol (IP) address based on said at least one border gateway protocol (BGP) attribute associated with said at least one internet protocol (IP) address,
- wherein said at least one border gateway protocol (BGP) attribute comprises a community attribute and wherein said at least one processor is operative to apply said firewall policy by applying said firewall policy to said packets from said at least one internet protocol (IP) address based on said community attribute, and wherein said community attribute corresponds to a characteristic of at least one subscriber and is distinct from an IP address of the subscriber, and
- wherein said at least one processor is operative to apply said firewall policy by subjecting said packets from said at least one internet protocol (IP) address to conventional firewall logic if said community attribute identifies a source of said packets, based on said community attribute, as an inappropriate source.

16. The firewall device of claim 15, wherein said at least one processor is operative to apply said firewall policy by passing said packets from said at least one internet protocol (IP) address if said community attribute identifies a source of said packets, based on said community attribute, as an appropriate source.

17. The firewall device of claim 16, wherein said appropriate source comprises at least one of a predetermined service provider and a predetermined content provider.

18. The firewall device of claim 15, wherein said at least one processor is operative to apply said firewall policy by dropping said packets from said at least one internet protocol (IP) address if said community attribute identifies a source of said packets, based on said community attribute, as an inappropriate source.

19. An apparatus comprising:
- means for determining whether packets can be routed from at least one internet protocol (IP) address in accordance with border gateway protocol (BGP) or a tuple policy;
- means for said routing packets from said at least one internet protocol (IP) address in accordance with border gateway protocol (BGP), bypassing determining compliance of said packets with said tuple policy;
- means for, while carrying out said routing in accordance with said border gateway protocol (BGP), noting at least one border gateway protocol (BGP) attribute associated with said at least one internet protocol (IP) address; and
- means for applying a firewall policy to said packets from said at least one internet protocol (IP) address based on said at least one border gateway protocol (BGP) attribute associated with said at least one internet protocol (IP) address.

20. The apparatus of claim 19, wherein said at least one border gateway protocol (BGP) attribute comprises a community attribute and wherein said means for applying apply said firewall policy to said packets from said at least one internet protocol (IP) address based on said community attribute, and wherein said community attribute corresponds to a characteristic of at least one subscriber and is distinct from an IP address of the subscriber.

21. The apparatus of claim 20, wherein said means for comprise means for passing said packets from said at least one internet protocol (IP) address if said community attribute identifies a source of said packets, based on said community attribute, as an appropriate source.

22. The apparatus of claim 21, wherein said appropriate source comprises at least one of a predetermined service provider and a predetermined content provider.

23. The apparatus of claim 20, wherein said means for applying comprise means for dropping said packets from said at least one internet protocol (IP) address if said community attribute identifies a source of said packets, based on said community attribute, as an inappropriate source.

24. The apparatus of claim 20, wherein said means for applying comprise means for subjecting said packets from said at least one internet protocol (IP) address to conventional firewall logic if said community attribute identifies a source of said packets, based on said community attribute, as an inappropriate source.

* * * * *